UNITED STATES PATENT OFFICE.

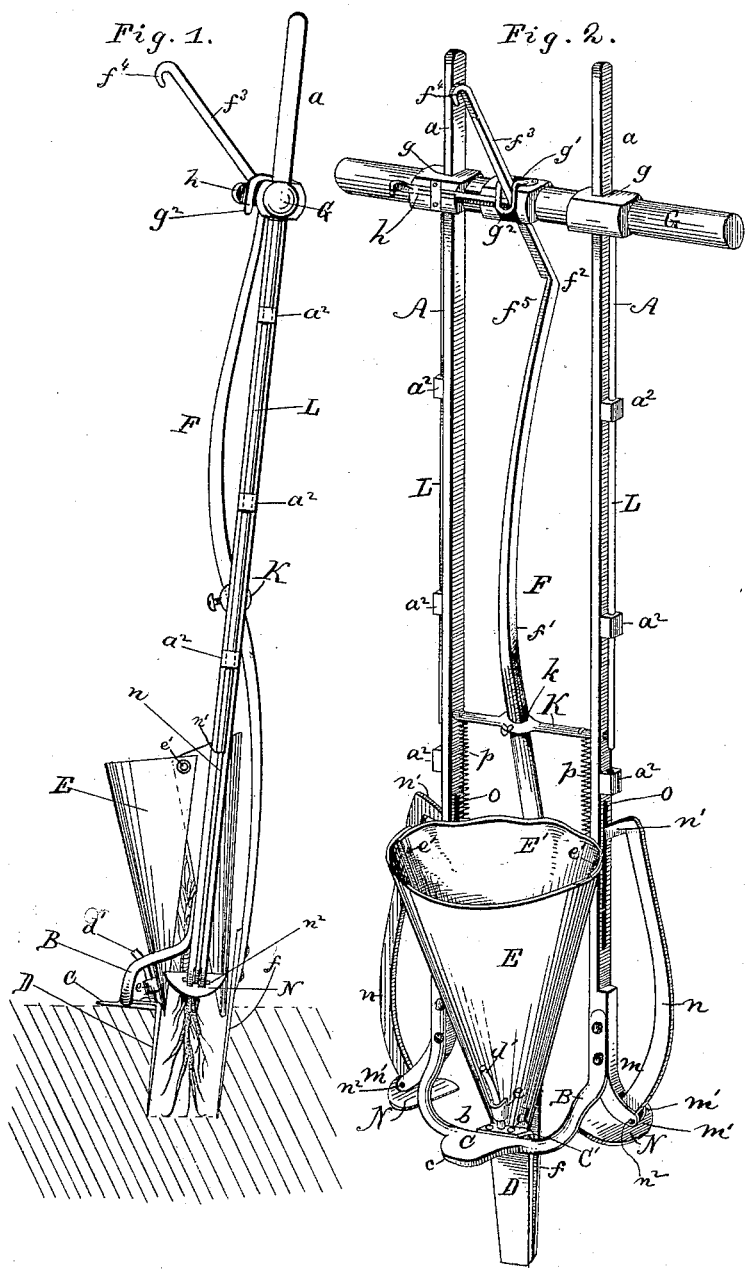

JOHN WILLIAM McKAY, OF LOUISVILLE, KENTUCKY.

MACHINE FOR SETTING PLANTS.

SPECIFICATION forming part of Letters Patent No. 390,500, dated October 2, 1888.

Application filed May 14, 1888. Serial No. 273,823. (No model.)

*To all whom it may concern:*

Be it known that I, JOHN WILLIAM MCKAY, a citizen of the United States, residing at Louisville, in the county of Jefferson and State of Kentucky, have invented certain new and useful Improvements in Machines for Setting Plants; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a perspective view. Fig. 2 is a side view.

This invention relates to improvements in plant-setters, more particularly to the one shown in United States Patent No. 186,698.

The device shown in this patent possesses some features which are not advantageous and which it is the object of the present invention to dispense with.

Referring to this patent, the "setter" has a rectangular base-plate, which prevents it from being forced too far into the ground. This plate not only renders the device in itself heavy, but by being clogged with dirt adds very materially to the labor necessary for the working of the device. The handle also is heavy and cumbrous. The present device either dispenses with or so modifies these parts as to render the device lighter, more efficient, and more easily operated.

In the annexed drawings, the letters A A designate the two main supports of the device, which are connected at the bottom in front by the downwardly-curved light bar B, having at its middle $b$ the flat plate C, which extends in front of the bar at $c$ and back of it at $c'$. To the rear end, $c'$, is bolted the upper end, $d$, of the front or stationary cutter, D, from the top of which rises a pin, $d'$, passing through a loop, $e$, upon the front jaw, E, of the hopper. The rear jaw, E', of the hopper is hinged at $e'$ $e'$ to the front jaw, and at its rear it is fastened to the handle F. This handle carries at its bottom the movable cutter $f$, parallel to the cutter D. The handle F rises upward and has the curve $f'$ and the angle $f^2$. It has its front end, $f^3$, projecting forward and terminating in the hook $f^4$. The upper ends, $a$ $a$, of the supports A A pass through slots $g$ $g$ in the cross-handle G. At the middle this handle has a notch, $g'$, in front of which is a loop, $g^2$, and beneath this loop the upper end of the handle F rests in the notch $g'$. Located alongside of the handle G is a spring-actuated catch-bolt, $h$, and at the angle $f^2$ the handle F has a shoulder, $f^5$, to receive the inner end of the bolt $h$.

Just above the hopper a rock-shaft, K, is journaled in the supports A A, and has a hole, $k$, at its middle, in which is secured the handle F. On the outside of the supports A A are the guides $a^2$, in which are the guide-rods L L, secured to the cross-handle G and projecting downward therefrom.

At the bottom the supports turn outward at $n$, and have the jaws $m'$ $m'$, through which pass the stems $n$ $n$ of the coverers N N, being held therein by pins $n^2$ $n^2$. The upper ends, $n'$ $n'$, of these stems pass through slots $o$ $o$ in the supports A A, and their inner extremities are connected by springs $p$ $p$ to the rock-shaft K.

In use the plant is placed root downward into the hopper. The setter is forced down into the ground, the cutters entering and making a hole, the plate C limiting the downward movement and regulating the depth of the hole. Pressure is applied upon the cross-handle G. The handle descends, and, moving along the portion $f$ of the handle F, rocks the latter with the shaft K, causing the jaws of the hopper to open, and the plant drops into the hole. At this point the handle G has descended so far that the bolt $h$ is below the shoulder $f^5$, and the guide-rods L L have passed through the lowest guide-eye $a^2$ and rest upon the stems $n$ of the coverers N N. Further pressure causes these rods L L to press upon the upper ends of these stems and thus move the coverers N N inward, covering the roots of the plant. The device is then in the position shown in Fig. 1, the cutters being about vertical. This position of the cutters is caused by the angle $f^2$, which causes the handle F to rock as the cross-handle G descends. As the "transplanter" or setter is withdrawn, the cutters pull up vertically without disturbing the earth or making a hole wherein air might enter to dry the ground. Upon relaxing the pressure the springs $p$ $p$ throw the handle G upward until the bolt $h$ catches against the shoulder $f^5$. The setter can then be drawn from the plant. The bolt $h$ is then outdrawn, the handle G moved upward, and the device is ready for another plant.

It will be seen that the light front bar, B, and the small plate C take the place of the large and cumbrous plate of the Williams device. No dirt will cling to this bar and plate. It is light and yet strong. It supports and braces the device, regulates the depth, and yet in no way interferes with its operation.

The pin $d'$, passing through the loop $e$, permits freedom of play to the jaw E. The handle F is of simple length without any extra bracing, and the hook $f^4$ prevents the cross-handle G from slipping off.

I am aware of United States Patent No. 196,840 for a combined plant-setter and seed-planter. This device has at the bottom a heavy frame to which the side bars are secured, which frame my device dispenses with.

Having described my invention, what I claim is—

1. In a plant-setter, the combination of the supports A A, the bar B, plate C, and the hopper, with the cutters, as set forth.

2. The combination of the hopper consisting of the stationary rear jaw, E', and the movable front jaw, E, the front jaw, E, having a loop, $e$, with the cutter D, having the pin $d'$ passing through the loop $e$, and the bar B, as set forth.

3. The combination of the hopper, the supports, the cross handle, the rock-shaft, and the spring-bolt with the handle K, having the curve $f'$ passing through the rock-shaft, having the angle $f^2$, the shoulder $f^5$, and the forwardly-projecting rod $f^3$, with the hook $f^4$, as set forth.

In testimony whereof I affix my signature in presence of two witnesses.

JOHN WILLIAM McKAY.

Witnesses:
G. C. WETSTEIN,
ISAAC R. W. MILLS.